United States Patent
Poeppelmann

(10) Patent No.: US 11,265,163 B2
(45) Date of Patent: Mar. 1, 2022

(54) METHOD AND PROCESSING DEVICE FOR PERFORMING A LATTICE-BASED CRYPTOGRAPHIC OPERATION

(71) Applicant: INFINEON TECHNOLOGIES AG, Neubiberg (DE)

(72) Inventor: Thomas Poeppelmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 266 days.

(21) Appl. No.: 16/377,292

(22) Filed: Apr. 8, 2019

(65) Prior Publication Data
US 2019/0312728 A1    Oct. 10, 2019

(30) Foreign Application Priority Data
Apr. 9, 2018 (DE) ...................... 10 2018 108 313.0

(51) Int. Cl.
*H04L 9/30* (2006.01)
*G09C 1/00* (2006.01)

(52) U.S. Cl.
CPC .............. *H04L 9/3093* (2013.01); *G09C 1/00* (2013.01)

(58) Field of Classification Search
CPC ..... H04L 9/3093; H04L 9/002; H04L 9/3247; H04L 9/0897; H04L 9/0662; H04L 2209/04; H04L 2209/08; G06F 21/72; G09C 1/00
See application file for complete search history.

(56) References Cited

U.S. PATENT DOCUMENTS

| | | | |
|---|---|---|---|
| 6,076,163 A | 6/2000 | Hoffstein et al. | |
| 9,673,977 B1 | 6/2017 | Kassem | |
| 10,644,876 B2* | 5/2020 | Williams | G06F 21/6218 |
| 2011/0243320 A1 | 10/2011 | Shai et al. | |

(Continued)

FOREIGN PATENT DOCUMENTS

| | | | | |
|---|---|---|---|---|
| AU | WO-03050998 A1 * | 6/2003 | ........... | H04L 9/3218 |
| DE | 69737097 T2 | 7/2007 | | |

(Continued)

OTHER PUBLICATIONS

Wei et al., A Public Cryptosystem from R-LWE, 2011, IEEE, pp. 508-513. (Year: 2011).*

(Continued)

*Primary Examiner* — Samson B Lemma
*Assistant Examiner* — Abdullah Almamun
(74) *Attorney, Agent, or Firm* — Viering, Jentschura & Partner mbB

(57) ABSTRACT

In various embodiments, a method for performing a lattice-based cryptographic operation is provided. The method includes obtaining a noise polynomial, a secret polynomial and a public polynomial, disguising at least one of the noise polynomial, the secret polynomial and the public polynomial by means of multiplying it with a random blinding polynomial, calculating the sum of the noise polynomial with the product of the public polynomial and the secret polynomial based on the disguised at least one polynomial, and determining a result of the lattice-based cryptographic operation based on the calculated sum of the noise polynomial with the product of the public polynomial and the secret polynomial.

20 Claims, 5 Drawing Sheets

(56) References Cited

U.S. PATENT DOCUMENTS

2019/0044720 A1   2/2019  Poeppelmann
2020/0153618 A1*  5/2020  Bhattacharya ............ H04L 9/14

FOREIGN PATENT DOCUMENTS

DE   102017117907 A1    2/2019
EP        3622663 B1 * 11/2020  ........... H04L 9/0858

OTHER PUBLICATIONS

German Office Action based on Application No. 10 2018 108 313.0 (8 pages) dated Mar. 27, 2019 (for reference purpose only).
Oder et al.; "Practical CCA2-Secure and Masked Ring-LWE Implementation"; IACR Transactions on Cryptographic Hardware and Embedded Systems; vol. 2018; Issue 1; pp. 142-174.
"Lattice-based cryptography"; https://en.wikipedia.org/wiki/Lattice-based_cryptography; page accessed on Jun. 4, 2018 (4 pages).

* cited by examiner

US 11,265,163 B2

METHOD AND PROCESSING DEVICE FOR PERFORMING A LATTICE-BASED CRYPTOGRAPHIC OPERATION

CROSS-REFERENCE TO RELATED APPLICATION

This application claims priority to German Patent Application Serial No. 10 2018 108 313.0, which was filed Apr. 9, 2018, and is incorporated herein by reference in its entirety.

TECHNICAL FIELD

The present disclosure relates to methods and processing devices for performing lattice-based cryptographic operations.

BACKGROUND

Recently, the US government announced that it will move away from classical asymmetric cryptosystems like RSA (Rivest Shamir Adleman) and ECC (Elliptic Curve Cryptography) to schemes which cannot be attacked by quantum computers. Currently, quantum computers are not available due to the technical complexity and engineering challenges but once built, they would be able to break RSA and ECC in polynomial time. Thus, also standardization bodies like NIST (National Institute of Standards and Technology) now actively investigate alternative cryptosystems. As a consequence, alternative schemes are investigated. One class of schemes that are supposed to resist attacks by quantum computers are lattice-based public key encryption, key exchange, or signature schemes. They could become the successor of RSA and ECC and either operate on large matrices (standard lattices) or polynomial rings (ideal lattices). Accordingly, approaches for secure implementation of lattice-based public key encryption are desirable.

SUMMARY

According to various embodiments, a method for performing a lattice-based cryptographic operation is provided including obtaining a noise polynomial, a secret polynomial and a public polynomial, disguising at least one of the noise polynomial, the secret polynomial and the public polynomial by multiplying it with a random blinding polynomial, calculating the sum of the noise polynomial with the product of the public polynomial and the secret polynomial based on the disguised polynomial (or the disguised polynomials) and determining a result of the lattice-based cryptographic operation based on the calculated sum of the noise polynomial with the product of the public polynomial and the secret polynomial.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

In the following, embodiments are described for randomizing the execution of lattice-based cryptosystems to prevent physical attacks such as fault and side-channel attacks. In various embodiments, a blinding method for lattice-based cryptosystems is described that counters side-channel attacks. A basic idea can be seen in the usage of a relationship between a random polynomial and its inverse in combination with features of the number theoretic transform.

The examples described herein can be realized as instructions processed by a processing device like a personal computer, microcontroller, smart card, secure microcontroller, hardware root of trust, (embedded) secure element (ESE), Trusted Platform Module (TPM), or Hardware Security Module (HSM).

Figure 1:
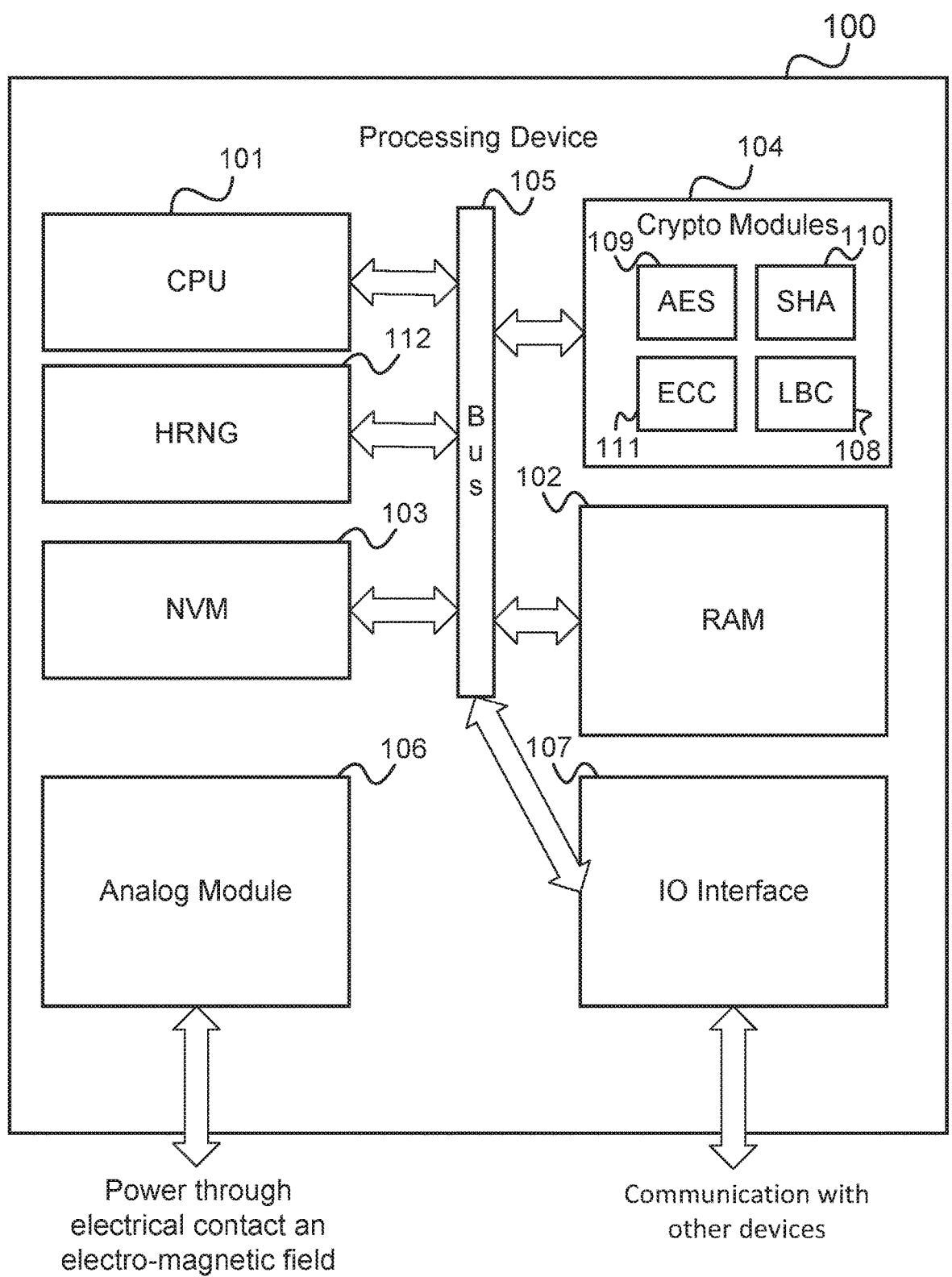
FIG. 1 shows a processing device having various components for performing cryptographic operations.

FIG. 1 shows an example for a processing device 100 including a CPU 101, a RANI 102, a non-volatile memory 103 (NVM), a crypto module 104, an analog module 106, an input/output interface 107 and a hardware-random number generator 112.

In this example, the CPU 101 has access to at least one crypto module 104 over a shared bus 105 to which each crypto module 104 is coupled. Each crypto module 104 may include one or more crypto cores to perform certain cryptographic operations. Exemplary crypto cores are:

an AES core 109,
an SHA core 110,
an ECC core 111, and
a lattice-based crypto (LBC) core 108.

The lattice-based crypto core 108 may be provided in order to accelerate lattice-based cryptography.

The CPU 101, the hardware random number generator 112, the NVM 103, the crypto module 104, the RAM 102 and the input/output interface 107 are connected to the bus 105. The input output interface 107 may have a connection 114 to other devices, which may be similar to the processing device 100.

The analog module 106 is supplied with electrical power via an electrical contact and/or via an electromagnetic field. This power is supplied to drive the circuitry of the processing device 100 and may allow the input/output interface to initiate and/or maintain connections to other devices via the connection 114.

The bus 105 itself may be masked or plain. Instructions for carrying out the processing and algorithms described in the following may be stored in the NVM 103 and processed by the CPU 105. The data processed may be stored in the NVM 103 or in the RAM 102. Supporting functions may be provided by the crypto modules 104 (e.g., expansion of pseudo random data). Random numbers are supplied by the hardware-random number generator 112.

The processing and algorithms described in the following may exclusively or at least partially be conducted on the crypto module 104, e.g., on the lattice-based crypto core 108. A crypto module 104 may or may not be equipped with hardware-based security features. Such hardware-based security features could be circuits that implement countermeasures against side-channel power analysis or fault injection (e.g., using a laser). Such countermeasures could be realized by the use of randomness, redundant hardware, or redundant processing. In general the goal of countermeasures is to disguise the internally processed values from an attacker who is able to observe the physical effect the processing of such values.

To perform the procedures described in the following, instructions may be stored in the lattice-based crypto core 108 or they may be provided by the CPU 101 via the bus 105. Data may be stored locally within the lattice-based crypto core 108. It is also an option that the data is temporarily stored in the RAM 102 or the NVM 103. The lattice-based crypto core 108 may also use other crypto modules to provide supporting functions (e.g., expansion of pseudo random data). The lattice-based crypto core 108 may also include a hardware-random number generator 112 or a means to generate physical and/or software random numbers.

The lattice-based crypto core 108 may support operations like polynomial addition or polynomial multiplication on data structures like array of coefficients, the sampling of random polynomials.

In another instance, the procedures described herein may at least partially be realized as a fixed CMOS circuit in the lattice-based crypto core 108 that is not controlled by the CPU 101 directly and where no intermediate values are available outside of the crypto core 108. Additionally, the accelerator may implement specific schemes as described in the literature like NewHope key exchange, Kyber public key encapsulation, GLP signature scheme, or Frodo public-key encryption. In this case only high level functionality is available to the CPU 101. Exemplarily, a signature may be generated where a message and a private key is transmitted into the lattice-based crypto core 108 over the bus 105 and then a GLP signature is computed that is retrieved by the CPU 101 using the bus 105 for further processing.

The components of the processing device 100 may for example be implemented on a single chip. The processing device 100 may be a chip card (or a chip card module) powered by direct electrical contact or through an electromagnetic field. The processing device 100 may be a fixed circuit or based on reconfigurable hardware (e.g., Field Programmable Gate Array, FPGA). The processing device 100 may be coupled to a personal computer, microcontroller, FPGA or a smart phone System on a Chip (SoC) or other components of a smart phone. The processing device 100 may be a chip that acts as Trusted Platform Module (TPM) offering cryptographic functionality (secure storage, secure time, signature generation and validation, attestation) according to a standardized interface to a computer, smart phone, Internet of Things (IoT) device, or car.

Figure 2:
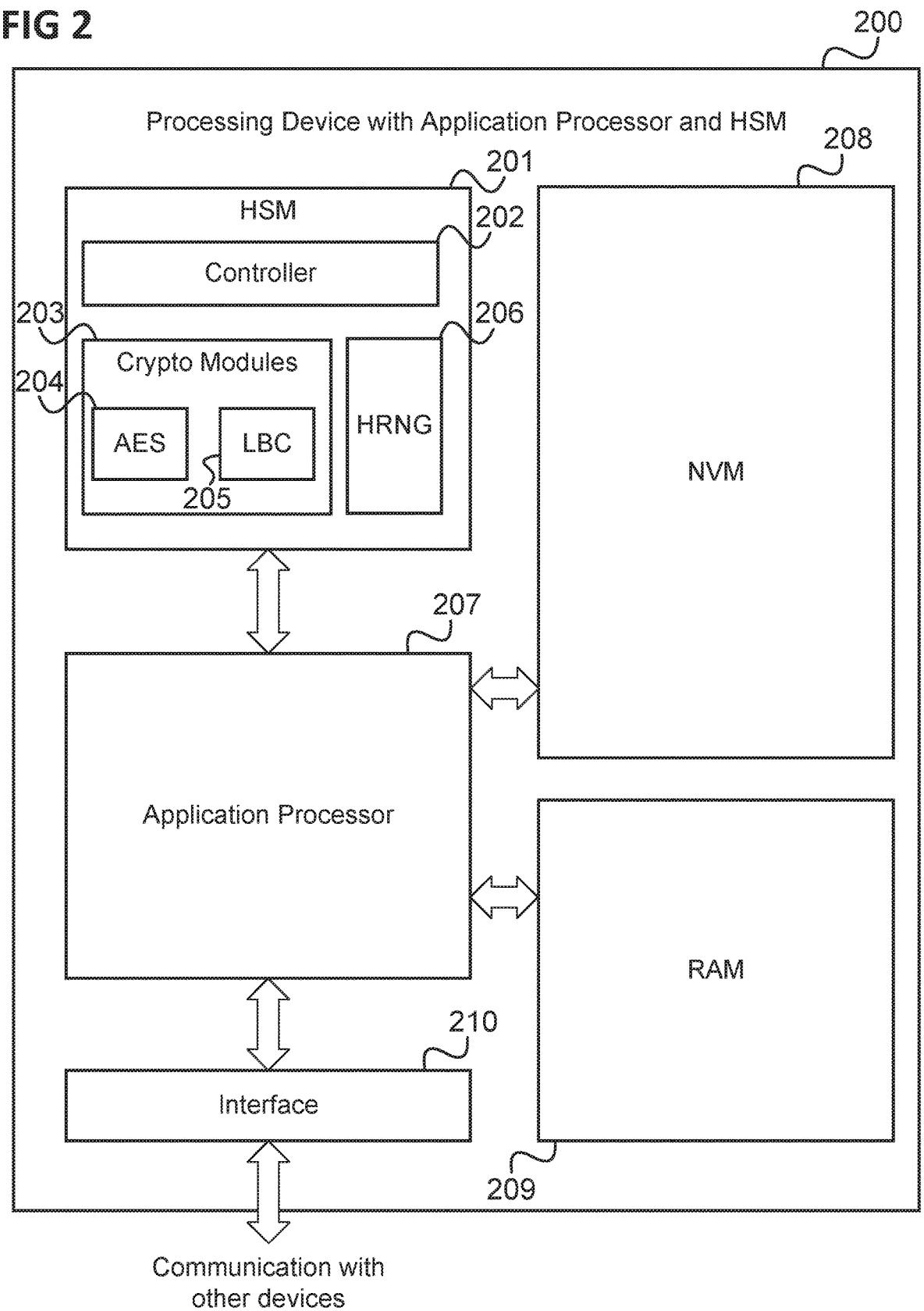
FIG. 2 shows another example of a processing device.

FIG. 2 shows another example of a processing device 200.

The processing device 200 includes an hardware security module 201, a non-volatile memory (NVM) 208, an application processor 207, a random access memory (RAM) 209, an interface 210 for communication with other devices and an application processor 207 coupled with the hardware security module (HSM) 201, the RAM 209 and the interface 210.

The HSM1 201 includes a controller 202, a hardware-random number generator (HRNG) 206 and crypto modules 203 including, as exemplary cores, an AES core 204 and an LBC core 205.

According to one embodiment, the hardware security module (HSM) 201 and the application processor 207 may be fabricated on the same physical chip with a tight coupling. The HSM 201 delivers cryptographic services and secured key storage while the application processor performs computationally intensive tasks (e.g., image recognition, communication, motor control). The defining property of the HSM 201 is that it is only accessible by a defined interface and considered independent of the rest of the system in a way that a security compromise of the application processor 207 has only limited impact on the security of the HSM 201. The HSM 201 may or may not perform all task or a subset of tasks described with respect to the processing device 200 by using the controller 202, the LBC 205, supported by, exemplary, an AES 204 and HRNG 206. It may execute the procedures described in the following (at least partially) either controlled by an internal controller or as CMOS circuit. Moreover, also the application processor 207 may perform the procedures described in the following (at least partially, e.g. in collaboration with the HSM 201). The processing device 200 with application processor and HSM may be used as a central communication gateway or (electric) motor control unit in cars or other vehicles.

The examples described herein may be based on at least one of the following approaches. In various embodiments, combinations of the following features may be utilized in order to reach a desired result. The features of a method may be combined with any feature(s) of a device, apparatus or system or vice versa.

In the following, background on lattice-based cryptography is described and notation used in the following is introduced.

Lattice-Based Cryptography

Various internet and industry standards use asymmetric cryptography based on RSA or elliptic curve cryptography (ECC) to protect data communication between smart cards, smart phones, computers, servers, or industrial control systems. As an example, with the RSA algorithm a public-key encryption (PKE) scheme can be realized that allows users to send an encrypted email (e.g., with PGP/GPG or S/MIME) to a recipient without the need to first exchange a symmetric key on a secured channel the public key of the recipient is sufficient to achieve confidentiality. Other applications of asymmetric cryptography are digital signatures, also based on RSA or ECC. They can be used to sign and verify data where the public key is used to check the validity of a signature. If a digitally signed contracts or long term archives is modified after signing, even by one bit, a digital signature check will fail.

Together, PKE and digital signatures are both crucial in the Transport Layer Security (TLS) protocol which is the backbone of secured communication in the Internet and used by browsers, smart phones and increasingly also IoT (Internet of Things) devices. TLS establishes a secured channel between two devices where communication is encrypted, checked for manipulation, and where the identity of the participants is verified using a digital certificate provided through a public-key infrastructure (PM). When connecting to a website, e.g., one of a bank, using https instead of http, the browser uses TLS. Commonly a green lock and further information is displayed to show that the communication is really performed with the bank's website and that attacks by a so-called man-in-the-middle are prevented. Without such a PM-based identity check in combination with strong data encryption it would be possible for attackers to manipulate the communication and to impersonate the accessed website.

However, since the seminal work of Peter Shor in 1994 it is known that RSA and ECC are susceptible to attacks by quantum computers. Additionally, the algorithm can also be adapted to break ECC-based public keys. A quantum computer can be described as a computer that makes direct use of quantum-mechanical phenomena to accelerate processing. Crucial concepts to build a quantum computer are so-called quantum-bits or qubits that are used to store the state in a quantum register. Currently, quantum computers powerful enough (e.g., with enough qubits) to implement Shor's are not available.

However, there is still general motivation to move away from classical asymmetric cryptosystems (RSA/ECC) to schemes which cannot be successfully attacked by quantum computers. Even if currently quantum computers require more work due to their technical complexity and engineering challenges, they might be able to break RSA and ECC in polynomial time in a in the future (maybe 15 to 20 years). As a consequence, new approaches for signature schemes, key exchange, and public-key encryption are required that are not based on the same foundations as RSA and ECC (i.e., the discrete logarithm problem or factoring). This need for new technical schemes has already been acknowledged by the standardization bodies like NIST (National Institute of Standards and Technology), which is now investigating alternative cryptosystems.

Cryptosystem may be understood to refer to cryptographic public key encryption, key exchange, or signature schemes but also advanced schemes like homomorphic encryption or attributed based encryption. In public-key encryption a non-secret public key is used to encrypt data that can only be decrypted with the associated secret key. In signature schemes a secret key is used to sign a message and it can be verified with the associated public key that the signer was in possession of the secret key and thus authorized to produce signatures. Key exchange, key establishment mechanisms (KEM), or key transport schemes are considered as interactive protocols where two parties establish a secret key that is unknown to a passive or sometimes active adversary or eavesdropper. Various symmetric key cryptography (e.g., AES), hash functions (e.g., SHA2), public key encryption, key exchange, or signature schemes may be combined into protocols like Transport Layer Security (TLS), Internet Key Exchange (IKE), Internet Protocol Security (IPsec), or Kerberos.

One class of schemes or that is supposed to resist attacks by quantum computers are lattice-based cryptosystems. Lattice-based cryptosystems might become the successor of RSA and ECC and usually operate on large matrices (standard lattices) or on polynomial rings (ideal lattices). However, recently also mixtures of both approaches have been introduced (e.g., in the schemes Kyber or Dilithium) that are based on so-called modular lattices.

A lattice is a structure that is created by integer linear combinations of basis vectors. Thus a lattice can be described as a regular structure in an n dimensional space. More precisely, a lattice is defined herein as an arrangement of points in an Euclidean space with a regular structure. Given n linearly independent vectors $b_i, \ldots, b_n \in \mathbb{R}^m$, the lattice $\mathcal{L}$ generated by them is defined as $\mathcal{L}(b_1, \ldots, b_n) \leq \{\Sigma x_i b_i | x_i \in \mathbb{Z}\}$. The vectors $b_i, \ldots, b_n$ are referred to as the basis of the lattice. An element of $\mathbb{R}^m$ is a m-dimensional vector with real coefficients. In a lattice $\mathcal{L}$ (i.e., an n-dimensional space) certain fundamental problems, like finding a short basis or a short vector are conjectured to be mathematically hard or at least complex enough to use them for cryptography. Usually the hardness of breaking a lattice-based cryptosystem can be reduced or related to the hardness of solving such a fundamental problem. Lattice-based cryptography or a lattice-based cryptosystem thus refers to a cryptographic system or construction whose security is based on the hardness or related to the hardness of certain mathematically hard problems in lattices. However, lattices as defined above do not necessarily need to be visible to the designer when implementing a scheme. The lattice is mostly a tool when proving security or estimating parameter sizes but the structures used for the scheme (i.e., structure that is visible to an engineer implementing the scheme) can be different.

Lattices have already been used to construct cryptosystems for several decades. Recently, lattice-based cryptography has also received much attention with the introduction of the user-friendly learning with errors (LWE) problem and ring-LWE (RLWE) problem. In this context a problem refers to a mathematical problem (e.g., find something) that is conjectured to be hard to solve (i.e., no polynomial time algorithm is available) but that also allows the construction of a cryptographic scheme (e.g., like factoring problem for RSA or discrete logarithm for ECC). In general, to solve the LWE problem, one has to recover a secret vector $s$ in $\mathbb{Z}_q^n$ when given a sequence of approximate (i.e. randomly perturbed) random linear equations on $s$. The LWE and RLWE problems thus allow the construction of schemes where the actual lattice structure is not really visible to the designer of a scheme.

However, when trying to solve instances of the LWE or RLWE problem, lattice algorithms may be used since the problem to find $s$ can be described as a lattice-problem. The RLWE problem works over polynomial rings and supports a security reduction to hard problems on ideal lattices while LWE enables reductions to so-called random (or arbitrary) lattices (i.e., the lattice does not have a structure). As a consequence, ideal lattices carry more structure than random lattices but also allow the design of schemes that achieve better public-key, cipher text, and signature lengths.

Prominent examples of lattice-based cryptography are the so-called NTRU and NTRU-sign schemes as well as the so-called GGH scheme. Examples for lattice-based (ephemeral) key-exchange or public-key encryption schemes are the Kyber, Newhope, NewHope-Simple, Hila5, ThreeBears, and Frodo schemes. It should be noted that for most schemes the conversion between key exchange and public key encryption is trivial. Additionally, for PKE various security levels like semantic security with respect to adaptive chosen plaintext (CPA) or semantic security with respect to adaptive chosen cipher text attacks (CCA) can be achieved using standard conversions (e.g. Fujisaki-Okamoto). This has exemplarily been shown for the NewHope scheme that can also be instantiated as a CPA-secure or CCA-secure PKE. Note that NewHope-Simple and other schemes are a straightforward adaptation of a scheme called LPR10. Examples of Lattice-based signature schemes are Dilithium, BLISS, GLP12, Flacon and Tesla.

Technical Challenges Concerning Lattice-Based Cryptography

When realizing lattice-based cryptography and lattice-based cryptosystems (e.g., NewHope, Dilithium, NTRU) on computers, microcontrollers, or as integrated circuit in a hardware-software co-design approach or as fixed circuit, multiple technical challenges arise when performing cryptography operations (e.g., signing, encryption, decryption, verification, key generation). Examples for such technical challenges arising in the field are:

1. Achieving optimal performance by performing certain steps of a cryptosystem using specifically optimized algorithms and by using all features of the available target hardware (special registers or instructions, special functionality realized in the hardware that is not standard, like co-processors).

2. Performing a cryptographic operation using a minimal amount of volatile or non-volatile memory.

3—Realizing a cryptographic operation, or parts thereof, with a minimum amount of logic circuitry and memory cells (e.g., formed by a CMOS process) given a performance target.

4. Efficient and comprehensive protection against implementation attacks (also referred to as physical attacks, observatory attacks, invasive and semi-invasive attacks) under consideration or in combination with or without challenges 1-3.

It should be noted that protection against implementation attacks/physical attacks is required when cryptosystems are executed on a security controller or in any adverse environment (e.g. on a Hardware Security Module). Possible attacks are side-channel attacks where an attacker tries to obtain secret information by observing the physical behavior of a device, like power consumption (e.g., simple and differential power analysis (SPA/DPA)), electric emanation, or temperature. Moreover, fault-attacks are a possibility where an attacker tries to introduce disturbances (e.g., with a laser) in the execution flow or data to obtain secret information or to influence the behavior of a device.

A distinct feature of an implementation attack is that such an attack does not exploit a weakness in the mathematical description of a scheme (that would be considered cryptanalysis) but in the way the scheme is realized on a specific device. In general the adversary is considered to have access to the device when performing an implementation attack. Usually, a device like a smart card is constructed in a way that physical effects (e.g., power consumption or radiation) are disguised to makes it hard to obtain security critical assets. A common approach to counter physical attacks is execution on randomized values to prevent invasive and non-invasive attacks with the goal of extracting a secret key or an intermediate value from a device become more difficult. However, it is a technical challenge to realize such randomizations or redundancy in an efficient way and without opening up further possibilities for attacks.

In the following, details on the realization of Lattice-based Cryptography are described.

Notation and Mathematical Background

The following notation, abbreviations and references are used herein globally while other objects like variables and polynomials may be defined locally:

q is an integer,
k is an integer,
mod q is the modulo operation modulo q defined over the integers where the result is in the range $[0,q-1]$,
$\mathbb{R}$ are the rational numbers (number than may have a fractional component),
$Z_q$ is the ring of integers modulo q which is the quotient ring $Z/qZ$ of equivalence classes of integers modulo q. The quotient ring is a construction in abstract algebra,
X is an indeterminate,
f is a ring of integer polynomial with maximum degree of integer n,
$R_q = Z_q[X]/(f)$ is a ring of integer polynomials modulo both the polynomial f and the integer q; the elements $v \in Z_q[X]/(f)$ can be represented by integer polynomials of degree less than n with coefficients reduced modulo q or alternatively as a coefficient vector $v \in Z_q^n$,
$\mathbf{v} \in R_q$ is a polynomial (written in bold) that is an element in $R_q$,
v[i] is a coefficient of a vector or polynomial $v \in R_q$ at a position i,
θ error distribution,
$\leftarrow^\$$ random sampling from a set or distribution,
$\psi_k$ binomial distribution with integer parameter k,
U( ) uniform distribution,
$1001_b$ a number in binary notation, such that $1001_b=9$,
$U(R_{q,k})$ uniformly random sampling of a polynomial in $R_q$ where all coefficients are uniformly random in $[-k, k]$,
FFT Fast Fourier Transform,
NTT Number Theoretic Transform,
DPA Differential Power Analysis,
SPA Simple Power Analysis,
ALU Arithmetic Logic Unit.

Ideal Lattices and Polynomial Arithmetic

Currently, there exist two flavors of lattice-based cryptography: ideal lattice-based cryptography and standard lattice-based cryptography. A middle ground is so-called modular lattice-based cryptography that mixes concepts from ideal and standard lattices.

The basic operations in ideal lattice-based cryptography are polynomial multiplications, additions, or subtractions in the quotient ring $$R_q = Z_q[x]/(f).$$

where the modulus q is an integer and the dimension (number of coefficients) is an integer n. polynomial a $\alpha \in R_q$ can be represented as an array of values and a single value at integer position i can be accessed. An array of values is a physical representation (e.g., in memory) while a polynomial is mathematical object. Herein, arrays and polynomials are implicitly treated as the same as they can be converted into each other or are just a different representation. Summarized, all major computations in lattice-based cryptosystems schemes may be performed on arrays of values modulo q (i.e., coefficients are $Z_q$) The reduction modulo q may be performed when a value is greater than or equal to q or a value may be allowed to grow if the data structure holding the value has still enough space available and a reduction modulo q may be performed only at the end of some computation (so-called "lazy reduction").

For the quotient rings, operations like addition, subtraction, multiplication and inversion can be defined which are cumulative and associative. An addition c=a+b for a,b,c $\in R_q$ may be defined as:

$$c = \sum_{i=0}^{n-1} (a[i] + b[i] \bmod q) \cdot X^i$$

where is an integer, a[i] is the i-th coefficient of a and b[i] is the i-th coefficient of b and X is an indeterminate. Subtraction c=a−b works in the same manner where "+" is replaced by "−".

The product c=a·b of polynomials a,b,c $\in R_q$ can also be computed. It is defined as a polynomial multiplication followed by a reduction modulo the polynomial f and a reduction modulo the integer q. Thus $$c = \left(\sum_{i=0}^{n-1}\sum_{j=0}^{n-1} a[i]b[j]x^{i+j} \bmod q\right) \bmod f.$$

If the algorithm is implemented or executed as stated above it is sometimes also referred to as "schoolbook" multiplication algorithm and requires roughly $n^2$ multiplications in $Z_q$. The formula for polynomial multiplication can be simplified by considering the fact that $x^n \equiv -1 \bmod f$ when $f=x^n+1$ (negacyclic convolution) but similar polynomials may be used accordingly. Thus $$c = \sum_{i=0}^{n-1}\sum_{j=0}^{n-1} (-1)^{\lfloor \frac{i+j}{n} \rfloor} a[i]b[j]x^{i+j \bmod n} \bmod q$$

where ands are integers, q is an integer, a[i] is the i-th coefficient of a and b[j] is the j-th coefficient of b and is the indeterminate.

Sparse Multiplication

Some efficiency for polynomial arithmetic can be gained with algorithms that exploit specific properties of polynomials. As an example, a polynomial $s \in R_q$ might only have few coefficients that are non-zero, might only consists of coefficients that are either one or minus one, or might in general have coefficients that are small, or might exhibit a combination of these properties. The optimization of such polynomial arithmetic is a standard technique and sometimes referred to as sparse multiplication in case only few coefficients are set.

The NTT

As mentioned, an implementation following the schoolbook formula for multiplication of polynomials would require $n^2$ modular multiplications i.e., multiplications in $Z_q$, and would thus be rather (computationally) expensive. Another approach for fast polynomial multiplication is the number theoretic transform (NTT). The NTT can be seen as a fast Fourier transformation (FFT) defined over a finite field or ring. Thus all complex roots of unity of the FFT are exchanged for integer roots of unity and computations are carried out in the ring of integers modulo an integer q. A polynomial multiplication for $a,b,c \in R_q$ using the NTT can be computed as $c=a \cdot b=NTT^{-1}(NTT(a) \circ NTT(b))$ where $\circ$ denotes coefficient wise multiplication, NTT(a) the transformation of the polynomial a, NTT(b) the transformation of the polynomial a, and $NTT^{-1}\bigcirc$ the inverse transformation. The coefficient-wise multiplication $c=a \circ b$ for $a,b,c \in R_q$ may be defined as $$c = \sum_{i=0}^{n-1}(a[i] \cdot b[i] \bmod q) \cdot x^i.$$

The advantage of the NTT is that an operation only requires roughly $n \log_2 n$ modular multiplications when an efficient algorithm is used and that the reduction modulo $f=x^n+1$ (so-called circular convolution property) or $f=x^n-1$ can be integrated into the NTT algorithm. Thus an π-point NTT is sufficient to work with n-coefficient polynomials. However, the NTT can also be used to perform efficient multiplication for arbitrary values of f. In this case an 2n-point NTT is used and afterwards a reduction modulo f is performed.

To formally introduce the NTT the choice of parameters is restricted and $f=x^n+1$ and prime integer $q \equiv 1 \bmod 2n$ are set so that the NTT exists. For a polynomial $g=\sum_{i=0}^{n-1} g[i] X^i \in R_q$ that $$NTT(g)=\hat{g}=\sum_{i=0}^{n-1} \hat{g}[i]x^i, \text{with } \hat{g}[i]=\sum_{j=0}^{N-1} \gamma^j g[j] \omega^{ij} \bmod q.$$

is defined where ω is an n-th primitive root of unity in $Z_q$ and $\gamma=\sqrt{\omega}$ mod.

The inverse transformation is similar to the forward transformation. For a polynomial $\hat{g} \in R_q$ $$NTT^{-1}(\hat{g})=g=\sum_{i=0}^{n-1} g[i]x^i, \text{ with } g[i]=(n^{-1}\gamma^{-1}\sum_{j=0}^{n-1} \hat{g}_j \omega^{-ij}) \bmod q$$

is defined.

A straightforward computation of the NTT that follows the previously given definition would have quadratic complexity and would not be more efficient than the schoolbook approach. Thus, to realize fast polynomial multiplication using the convolution theorem a fast algorithm to compute the NTT is required. The most straightforward implementation of the NTT with O(n log n) operations in $Z_q$ is a Cooley-Tukey radix-2 decimation-in-time (DIT) algorithm or a decimation-in-frequency (DIF) algorithm. The DIT NTT algorithm recursively splits the computation into a sub-problem on the even inputs and a sub-problem on the odd inputs of the NTT.

Computation of a Polynomial Inverse

Computation of a polynomial inverse is often required in signature algorithms or key generation. This means that some algorithms require the computation of an inverse of a polynomial $a^{-1}$ for $a \in R_q$ such that $a \cdot a^{-1}=1$. An approach to compute the multiplicative inverse of integers in $Z_q$ but also $R_q$ is Fermat's little theorem. Besides techniques known to the expert, like the Extended Euclidean Algorithm, an efficient way to compute the inversion is to use the NTT together with Fermat's little theorem. Fermat's little theorem is mainly known to teach how to compute a multiplicative inverse of integers in $Z_q$. With this method a polynomial $a \in R_q$ is transformed into the NTT domain as $\hat{a}=NTT(a)$ and then Fermat's little theorem is used which states that $\hat{a}^{-1}=\hat{a}^{q-2}$ in case $a \in R_q$ is invertible for an appropriate choice of $R_q$. For the exponentiation methods like (right-to-left or left-to-right) square-and-multiply, or an addition chain are available. When a is transformed into the NTT domain, a multiplication is just a coefficient wise-multiplication. As an example, $a^3$ can be computed as $\hat{a}=NTT(a)$ and $\hat{a}^3=NTT^{-1}(\hat{a} \circ \hat{a} \circ \hat{a})$ which is usually faster than computing $a^3=a \cdot a \cdot a$ using algorithms like schoolbook or Karatsuba multiplication. With an addition chain the number of coefficient wise multiplications can be further reduced depending on the share of q. As an example for q=12289 an addition chain can be used that requires 18 polynomial multiplications. Processing the exponent $12289-2=12287=10111111111111_b$ bit-wise using a square-and-multiply algorithm would need 25 polynomial multiplications.

Randomness and Random Sampling

By $\alpha \leftarrow^\$ S$ the action of selecting variable a independently and uniformly at random from some set S or a specific distribution S is denoted. It is noted that "random" or "uniform" in this regard (e.g., selecting randomly or any random value) may be a true random, a pseudo-random or a deterministic approach to obtain a value Hence, the property of such "randomness" or any random effect used according to an embodiment may be that an attacker is unaware of the value and that values are different for at least a portion of operations. The randomness may add a certain level of entropy between values that are "randomly" determined, e.g., generated or selected. For a finite S the uniform distribution on S is denoted by U(S). Further, the notation $a \leftarrow^\$ U(R_{q,k})$ is used to denote the uniformly random sampling of $a \in R_q$ where all coefficients of a are [-k,k]. For a probability distribution $\chi$ it is assumed that sampling can be performed efficiently the notation $t \leftarrow^\$ \chi$ is used to denote the random sampling of variable t from $\chi$. The notation $a \leftarrow^\$ \chi^n$ is used to denote the random sampling of $a \in R_q$ where coefficients are independent and follow $\chi$.

Sampling means the generation of random data that follows a certain specified distribution. A sampler is defined as a piece of code or a set of instructions or a hardware circuit that is performing the generation Usually, the sampler has access to a source of (uniform) randomness or is initiated with a seed from which pseudo random data is generated. The sampling of secret noise or error vectors is a basic task in lattice-based public-key encryption (PKE), key exchange, signature schemes and other schemes (e.g. homomorphic encryption). A particular attribute of such noise or error vectors is that they are usually small (i.e., with coefficients that are close to zero). The discrete Gaussian distribution $D_{z,\sigma}$ with mean 0 and standard deviation $\sigma > 0$ over the integers associates the probability $\rho_\sigma(x)/\rho_\sigma(Z)$ to $x \in Z$ for $$\rho_\sigma(x) = \exp\left(\frac{-x^2}{2\sigma^2}\right)$$

and $\rho_\sigma(Z) = 1 + \Sigma_{i=1}^\infty \rho_\sigma(i)$. Thus, by $a \leftarrow^\$ D_{z,\sigma}$ the process of randomly sampling a value $d \in Z$ according to $D_{z,\sigma}$ is denoted. By $a \leftarrow^\$ D_{z,\sigma}^n$ the process of randomly sampling of a polynomial $a \in R_q$ of dimension n where coefficients are independent and distributed according to $D_{z,\sigma}$ is denoted. A sampler that produces values according to a discrete Gaussian distribution can be implemented given access to a source of random bits using the cumulative distribution function (CDF) or a cumulative distribution table (CDT) or with high-precision computations. Other approaches are the Knuth-Yao algorithm, rejection sampling, or the ziggurat algorithm.

As Gaussian sampling is still costly in terms of computation effort and thus noise distributions may be used that are easier to sample than discrete Gaussians. This may be important as the execution of a cryptographic scheme usually requires 512 to 4096 samples from the noise or error distribution. A simpler to use distribution is the binomial distribution $\psi^k$. A sample from $\psi_k$ may be generated by computing $\Sigma_{i=0}^{k-1} b_i - b_i^1$ where $b_i, b_i^1 \in [0,1]$ are uniform independent bits. Thus by $a \leftarrow^\$ \psi_k$ the process of randomly sampling a value $d \in Z$ according to $\psi_k$ is denoted. By $a \leftarrow^\$ \psi_k^n$ the process of randomly sampling a polynomial $n \in R_q$ of dimension n where coefficients are independent and distributed according to $\psi_k$ is denoted. The standard deviation of the binomial distribution is $\sqrt{k/2}$ and the variance is k/2. An alternative approach to sample from $\psi_k$ is to compute $(\Sigma_{i=0}^{2k-1} b_i) - k$ where $b_i \in (0,1)$ are uniform independent bits.

A sampler of the binomial distribution may be implemented given access to a source of random bits. One approach is to obtain two random bit strings each of length k, to compute the integer Hamming weights $h_1 = HW(v_1)$ and $h_2 = HW(v_2)$, and to then output $h_1 - h_2$ as the output of the sampler.

Mathematical Problems on Lattices

The security of lattice-based cryptosystems may be based on or can be related to certain problems and variants thereof. Such specific problems that are known to one skilled in the art are:

The learning with errors problems (LWE)
The ring learning with errors problem (RLWE)
The short integer solution problem (SIS)
The ring short integer solution problem (RSIS)
The NTRU problem In the following, an informal definition of the RLWE problem is given.

Let R denote the ring $R_q = Z_q[x]/(x^n+1)$ for n being an integer power of 2 and integer q. The RLWE problem, for m>0 samples, modulo q and with error distribution a over Z is defined as follows:

For appropriate values of n, q, appropriate choice of $\theta$, secret $s \in R_q$ and $a \in R_q$, both with uniform coefficients in $Z_q$, and given integer m samples of the form (a; b=a·s+e) where $a \in R_q$ has coefficients drawn from recover the secret polynomial s.

The RLWE problem translates the well-known LWE problem into the ring setting. The hardness of RLWE can be based on the worst-case hardness of short-vector problems on ideal lattices, which are a subclass of standard lattices. The RLWE problem also has a decision version (decide if is from the RLWE distribution or uniform when given polynomials a, $b \in R_q$) that is considered to be equivalent in hardness to the search version for certain parameters. It is also possible to sample the secret $s \in R_q$ from the error distribution $\theta$ instead of the uniform distribution $U(R_q)$. This form of the RLWE (and also standard LWE) problem is sometimes called the "Hermite normal form". The RLWE problem has been proved to be hard when the error distribution is a discrete Gaussian of high precision ($\theta = D_{z,\sigma}^n$) and the parameters are selected in a certain way. However, in practice the problem also remains hard for discrete Gaussians that are sampled with less precision, for the binomial distribution ($\theta = \psi_k^n$), or for a small uniform distribution $\theta = U(R_{q,k})$.

Operations in standard lattice-based cryptography include matrix-matrix multiplications, matrix-vector multiplications or vector additions and subtractions where coefficients are values in the ring of integers modulo q.

Public-Key Encryption and Key Exchange Schemes

The properties of the RLWE problem can be used to realize a semantically secure public-key encryption scheme with a reduction to decisional RLWE. Thus, in the plain version only security against chosen plaintext attacks (CPA) is achieved and is categorized as a lattice-based cryptosystem as the hardness is based on the hardness of the RLWE problem which itself is based on the hardness of certain lattice problems. The general idea of the scheme is to hide the secret key inside of a RLWE sample that becomes the public key ($p = r_1 - a \cdot r_2$, the is just a technicality) and to mask the message with a RLWE sample ($p \cdot e_1 + _3$). Thus, the public key and each cipher text appear uniformly random to a passive adversary and semantic security is achieved. The scheme to which reference is made herein is usually attributed either to Lyubashevsky, Peikert, and Regev or Lindner and Peikert and sometimes also referred to as LPR10. For example, the following procedures are carried out.

RLWE.CPA.Gen:
1. Choose $a \leftarrow U(R_q)$
2. $r_2 \leftarrow^\$ \theta$
3. $r_2 \leftarrow^\$ \theta$
4. Public key (pk): $p = r_1 - a \cdot r_2 \in R_q$ 5. Secret key: (sk): $r_2$
6. Return pk=a,p,sk=$r_2$
RLWE.CPA.Enc(a,p,m$\in$(0,1)$^n$)
1. $e_1 \leftarrow^\$ \theta$
2. $e_2 \leftarrow^\$ \theta$
3. $e_3 \leftarrow^\$ \theta$
4. $\bar{m}$=encode(m).
5. Return [$c_1$=a·$e_1$+$e_2$, $c_2$=p·$e_1$+$e_3$+$\bar{m}$]
RLWE.CPA.Dec(c=[$c_1$,$c_2$], $r_2$):
1. Return decode($c_1 \cdot r_2 + c_2$)

The scheme is usually instantiated in the polynomial ring $R_q$ but usage of other rings is straightforward. A possible choice for the error distribution $\theta$ is $D_{z,\alpha}{}^n$ or $\psi_k{}^n$. Its key generation procedure RLWE.CPA.Gen just requires the random sampling of two noise polynomials $r_1$, $r_2$ from the error distribution $\theta$. The public key is a and p=$r_1$−$\alpha \cdot r_2$. The polynomial a can be chosen during key generation (as part of each public key) or regarded as a global constant, or be generated on-the-fly based on a seed. The polynomial $r_z$ is used only during key generation and discarded afterwards, while $r_2$ is the secret key. Extraction of $r_2$ from the public key p is considered equivalent to solving the RLWE problem.

The encryption procedure RLWE.CPA.Enc requires the sampling of three noise polynomials $e_1$, $e_2$, $e_3$ from the error distribution $\theta$. To hide the message in the cipher text, it is encoded as $\bar{m}$ and added to p·$e_1$+$e_3$. The cipher text consists of $c_1$ and $c_2$ which are basically both RLWE samples in Hermite normal form. Security against chosen plaintext attacks (CPA) follows from the fact that everything that is returned by the encryption algorithm is indistinguishable from random.

The decryption procedure RLWE.CPA.Enc requires knowledge of the secret key r: since otherwise the large term r cannot be eliminated when computing $c_1 r_2 + c_2$. The encoding of the n-bit message $\hat{m}$ is necessary as some small noise (i.e., $r_2 e_2 + r_1 e_1 + e_3$) is still present after calculating $c_1 r_2 + c_2$ and would prohibit the retrieval of the message after decryption:

$$c_1 r_2 + c_2 = \alpha e_1 + e_2) r_2 + p e_1 + e_3 + \hat{m} = r_2 a e_1 + r_2 e_2 + r_1 e_1 - r_2 \alpha e_1 + e_3 + \hat{m} = \hat{m} + r_2 e_2 + r_1 e_1 + e_3$$

Note that the noise is relatively small as all noise terms are sampled from the error distribution $\theta$. To deal with the remaining noise threshold encoding functions for individual coefficients were proposed.

Example parameters to instantiate the scheme are:
(n=256, q=4093, $\theta = D_{z,\sigma}{}^n \cdot \sigma$=8.35) to which roughly 100 bit security is attributed,
(n=512, q=12289, $\theta = D_{2,\sigma}{}^n$, $\sigma$=11.31) to which roughly 128 bit security is attributed, and
(n=1024, q=12289, $\theta = \psi_k{}^n$, k=16) to which roughly 256 bit security is attributed.

To achieve semantic security in the presence of active adversaries, a Chosen Chipertext Attack (CCA) conversions like the one by Targhi and Unruh based on the Fujisaki-Okamoto can be straightforwardly applied by an expert in the field.

Description of the Güneysu Lyubashevsky Pöppelmann (GLP12) Scheme

In 2012 Güneysu, Lyubashevsky, and Pöppelmann proposed a signature scheme that is a combination of previous schemes by Lyubashevsky as well as an additional optimization that allows the reduction of the signature length by almost a factor of two. The security of the scheme is based on a lattice related problem where one is given an ordered pair of polynomials (a,t)$\in R_q \times R_q$ where $\alpha$ is chosen uniformly from $R_q$ and t=$as_1 + s_2$, where $s_3$ and $s_2$ are chosen uniformly from (−k, . . . , k)$^n$, and is asked to find an ordered pair ($s_1$,$s_2$) such that $as_1 + s_2$=t. It is thus similar to the RLWE problem.

There are two versions of the GLP signature scheme. In the following, the "optimized" variant is described which, compared to the "basic" variant, includes a compression algorithm for the second component of the signature. It includes the following procedures:

GLP.GEN( )
1) $\alpha \leftarrow^\$ R_q$
2) $s_1, s_2 \leftarrow^\$ R_1$
3) t=$\alpha s_1 + s_2$
4) Return pk=(t, $\alpha$) and sk=($s_1$,$s_2$)

GLP.SIGNG ($\mu \in (0,1)^t$, sk=($s_1$,$s_2$),pk=(t,a))
1) $y_1, y_2 \leftarrow^\$ R_{q,k}$
2) c=H((a$y_1$+$y_2$)$^{(1)}$,$\mu$)
3) $z_1$=$s_1$c+$y_1$
4) $z_2$=$s_2$c+$y_2$
5) If $z_1$ or $z_2 \notin R_{q,k-21}$ then goto step 1
6) $z_2'$=Compress($\alpha z_1$−tc,$z_2$,k−32)
7) If $z_2'$=$\perp$ then goto step 1
8) Return sig=($z_1, s_2', c$)

GLP.VERIFY ($\mu \in (0,1)^\circ$, sig=($z_1, z_2', c$),sk=($s_1$,$s_2$))
1) Accept iff $z_1, z_2' \in R_{q,k-32}$ and H(($\alpha z_1 + z_2^{y'}$−tc)$^{(1)}$,$\mu$)=c The key generation algorithm GLP.GEN( ) basically requires sampling of random polynomials $s_1, s_2 \in R_q$ followed by one polynomial multiplication and an addition. The polynomials $s_1$ and $s_2$ have small coefficients in {−1, 0, 1} while all coefficients of a and t are uniformly random in $Z_q$. The private key $s_k$=($s_1$,$s_2$) consists of the values $s_1$,$s_2$ and the public key is pk=(t,$\alpha$). Extraction of the secret key from the public key would require an adversary to solve the search version of the so-called Decision Compact Knapsack (DCK) problem that was also introduced by Güneysu, Lyubashevsky, and Pöppelmann.

The signing procedure GLP.SIGN takes the message $\mu \in (0,1)^\circ$, the secret key sk and the public key pk, as input. In 1, two polynomials y1, y2 are chosen uniformly at random with coefficients in the range [−k,k]. In 3, a hash function H is applied on the higher-order bits (denotes by (s)$^{(1)}$) of a$y_1$+$y_2$, which outputs a polynomial c$\in R_q$ by interpreting the first 160-bit of the hash output as a sparse polynomial. In 3 and 4, $y_1$ and $y_2$ are used to mask the private key by computing $z_1$ and $z_2$. The procedure only continues if all coefficients of $s_1$ and $z_2$ are in the range [−(k−32),k−32] and restarts otherwise. The polynomial $z_2$ is then compressed into $z_2'$ in step 6 by the Compress function. This compression is part of the aggressive size reduction of the signature sig=($z_1,z_2',c$) since only some portions of $z_2$ are necessary to maintain the security of the scheme. For the implemented parameter set Compress has a chance of failure of less than two percent which results in the restart of the whole signing process.

The verification procedure GLP.VERIFY first checks that all coefficients of $z_1, z_2'$ are in the range [−(k−32),k−32] and does not accept the invalid signature otherwise. Next, $z_1+z_2'$−tc is computed, transformed into the higher-order bits and hashed together with the message $\mu$. It is then verified that H(($\alpha z_1/z_2'$−tc)$^{(1)}$,$\mu$) equals c from the signature.

In the following, approaches for efficiently randomizing the execution of lattice-based cryptosystems to prevent fault and side-channel attacks according to various embodiments are described.

A standard operation in ideal lattice-based cryptosystems (e.g., key exchange like NewHope, public key encryption, or signature schemes like BLISS or GLP12) is the computation of t=a·s+e where all elements are polynomials a,s,y,e$\in R_q$ and where $\alpha \leftarrow^\$ U(R_q), s \leftarrow^\$ \theta$ for the distribution $\theta'$ of the so-called secrets and $e \leftarrow^\$ \theta''$ and for the distribution $\theta''$ of the so-called error $e$. The distribution $\theta'$ and $\theta''$ are sometimes the same. Possible choices for one or the other are also the uniform distribution $U(R_q)$, a discrete Gaussian distribution $D_{z,s}$ (e.g., in LPR10), a binomial distribution $\psi_k$ (e.g., in NewHope), a small uniform distribution $U(R_{q,k})$ (e.g., in GLP12). An operation of the form $t=a \cdot s+e$ can be found in all operations of NewHope but also in BLISS, GLP12, and other lattice-based cryptosystems. In general the values $s,e$ are considered to be secret and should be hidden from an adversary. They might be ephemeral values (values used only once) or they may be secret keys used in multiple executions. As a consequence, protection against side-channel attacks is desirable.

According to various embodiments, a scheme to randomize $s$ and $e$ is used when computing $t=a \cdot s+e$ under the assumption that an attacker may know $a$ or $t$, or may be able to obtain one or the other value or partial information in some way. It should be noted that it is assumed to be hard to extract $s,e$ from $t$ due to the conjectured hardness of the RLWE problem.

According to an embodiment, the values $s$ and $e$ are randomized using a blinding coefficient or blinding polynomial that is not known to the attacker.

According to an embodiment, the following procedure "ComputeBlindedInv" is performed to compute $t=$
ComputeBlindedInv Inputs: $a,s,e \in R_q$ Outputs: $t=a \cdot s+e \in R_q$ 1. Generation of $(z,z^{-1})$
 a. Sample blinding polynomial $z \leftarrow^\$ U(R_q)$
 b. Compute the inverse $z^{-1}$ of the blinding polynomial $z$. Jump to 1 if $z$ is not invertible.
2. Compute $s'=z \cdot s$
3. Compute $e'=z \cdot e$
4. Compute $t'=a \cdot s'+e'$
5. Compute $t=t' \cdot z^{-1}=\alpha s+e$ As the attacker does not know $z$ it becomes hard to exploit leakage from the computation of $z \cdot s$ or $z \cdot e$. Additionally, it is hard to exploit leakage from the computation of $a \cdot s'$ as $s'=z \cdot s$ and thus randomized. The final multiplication by $z^{-1}$ directly leads to $t$, the intended result.

When the NTT is used it is possible to assume that $\alpha,s,e$ are already transformed into the NTT domain. Moreover, it is possible to just sample a random $z$ and to then use it as if it was already in the NTT domain. The NTT maps uniform polynomials to uniform polynomials so it is not necessary to transform a uniform polynomial first (the NTT is a one to one map). According to an embodiment, the following procedure "ComputeBlindedInvNTT" for computation of $t=a \cdot s+e$ in the NTT domain is performed.
ComputeBlindedInvNTT Inputs: $\hat{a}$NTT$(\alpha), \hat{s}$=NTT$(s), \hat{e}$=NTT$(e) \in R_e$ Outputs: $t=\alpha \cdot s+e \in R_q$ 1. Generation of $(\hat{z},\hat{z}^{-1})$
 a. Sample blinding polynomial $z \leftarrow^\$ U(R_q)$.
 b. Assume that $z$ is in NTT format and set $\hat{z}=z$ (possible as NTT maps uniform to uniform)
 c. Compute the inverse $\hat{z}^{-1}$ of the blinding polynomial $z$. This can be done in the NTT domain using Fermat's little theorem. Jump to 1 if $z$ is not invertible.

2. Compute $\hat{s}'=\hat{z} \circ \hat{s}$
3. Compute $\hat{e}'=\hat{z} \circ \hat{e}$
4. Compute $\hat{t}'=\hat{a} \circ \hat{s}' \circ \hat{e}'$
5. Compute $\hat{t}=\hat{t}' \cdot \hat{z}^{-1}$
6. Compute $t=$NTT$^{-1}(t)$ The computation of random pairs $z,z^{-1} \in R_q$ is computationally expensive in operation 1 of ComputeBlindedInv and ComputeBlindedInvNTT. Choosing and computing a new pair may cost too many resources. A reuse of $z$, $z^{-1}$ in multiple executions is dangerous as the randomization gets weakened this way. However, a method is available that can be used. The approach is to store a pair $z,z^{-1}$ or $(\hat{z},\hat{z}^{-1})$ when the NTT is used between executions and to refresh it before each use and to optionally store the refreshed value.

The pair of a polynomials $z,z^{-1}$ can be refreshed by raising both values to a random integer power $x$. As an example, the pair $(z,z^{-1})$ can be refreshed by computing $(z_{new}=z^s, z_{new}^{-1}=(z^{-1})^x)$. The same holds true when the NTT is used $(\hat{z},\hat{z}^{-1})$. In the case of the NTT an exponentiation by random integer power $x$ can be efficiently computed in the NTT domain using a square-and-multiply algorithm or an addition chain.

In case $s,e$ form a constant secret key they may according to one embodiment be stored in the NTT domain but also in a blinded manner in a non-volatile or volatile memory. To compute a blinded version for storage (e.g., during key generation) the following procedure may be carried out:
1. $s \leftarrow^\$ \theta'$
2. $e \leftarrow^\$ \theta''$
3. $\hat{s}$=NTT$(s)$
4. $\hat{e}$=NTT$(e)$
5. Generation of $(\hat{z}_g,\hat{z}_g^{-1})$ as in 1 of ComputeBlindedInvNTT
6. Output $(\hat{s} \circ \hat{z}_g, \hat{e} \circ \hat{z}_g, \hat{z}_g^{-1})$ The triple $(\hat{s} \circ \hat{z}_g, \hat{e} \circ \hat{z}_g, \hat{z}_g^{-1})$ can now be used. The value of and is multiplicatively masked by $\hat{z}_g$. For example, the following procedure ComputeBlindedInvNTTSharedKey is carried out.
ComputeBlindedInvNTTSharedKey Inputs: $\hat{a}$=NTT$(a),(\hat{s}_k=\hat{s} \circ \hat{z}_g, \hat{e}_k=\hat{e} \circ \hat{z}_g, \hat{z}_k^{-1})$ Outputs: $t=\alpha \cdot s+e \in R_q$ 1. Generation of $(\hat{z},\hat{z}^{-1})$ as in 1 of ComputeBlindedInvNTT
2. Compute $\hat{s}'=\hat{z} \circ \hat{s}k$
3. Compute $\hat{e}'=\hat{z} \circ \hat{e}k$
4. Compute $\hat{t}'=\hat{a} \circ \hat{s}' \circ \hat{e}'$
5. Compute $\hat{t}=\hat{t}' \cdot \hat{z}^{-1} \circ \hat{z}_k^{-1}$
6. Compute $t=$NTT$^{-1}(t)$ The procedure ComputeBlindedInvNTTSharedKey operates on multiplicatively masked secrets that are already stored in the NTT domain, which is important for efficiency. It then uses the approach from ComputeBlindedInvNTT to perform a refresh of the mask before it is used and combined with a presumably public value $\hat{a}$.

If efficiency is a concern for ComputeBlindedInv, ComputeBlindedInvNTT, and ComputeBlindedInvNTTSharedKey an option is also to only blind the secret $s$ by computing $z \cdot s$ but by not blinding $e$. Then the procedure is:
1. Generation of $(z,z^{-1})$
2. Compute $s'=z \cdot s$
3. Compute $t'=\alpha \cdot s'+e$
4. Compute $t=t' \cdot z^{-1}=\alpha \cdot s+e$ According to one embodiment an optimization that is using low weight blinding is used. The idea is that multiplication by a sparse polynomial can be optimized. A polynomial is sparse l<<n coefficients are set (thus there are n−l zero coefficients). The multiplication procedure can just scan the sparse polynomial for values other than zero or directly get only a list with the set positions and their value. This way the amount of inner products to be computed is reduced from n to l. Also the NTT of a sparse polynomial can be optimized to account for that fact. An example for the procedure is given in the following.

ComputeBlindedSparse

Inputs: $a,s,e \in R_q$

Outputs: $t=\alpha \cdot s+e \in R_q$

1. Sample blinding polynomial z such that only l coefficients are set. These l coefficients are sampled uniformly random from $U(Z_q)$.
2. Compute s'=z·s by using a fast sparse multiplication algorithm
3. Compute e'=z·e by using a fast sparse multiplication
4. Compute ê'=NTT(e')
5. Compute ŝ'=NTT(s')
6. Compute ẑ'=NTT(z')
7. Compute â=NTT(α) (a is a public value)
8. Compute ĥ=â∘ŝ'+ê'
9. Compute t̂=ĥ∘ẑ-1
10. Compute t=NTT$^{-1}$(t)

Another approach to blind is given by the following procedure:

ComputeBlindedAddNTT

Inputs: $a,s,e \in R_q$

Outputs: $t=\alpha=s+e \in R_q$

1. Generation of blinding value (z,ẑ)
   a. Sample blinding polynomial z←$^\$$U(R$_q$)
   b. Compute the NTT form ẑ=NTT(z) of the blinding polynomial z.
2. Compute s'=z+s
3. Compute ŝ'=NTT(s')
4. Compute e'=z+e
5. Compute ê'=NTT(e')
6. Compute â=NTT(a) (a is a public value)
7. Compute t̂'=â∘ŝ'+ê'
8. Compute t̂=t̂'-â∘ẑ-ẑ
9. Compute t=NTT$^{-1}$(t̂)

An advantage of this procedure is that the computation (NTT(s') and NTT(e')) of the NTT on the secret values s,e is already blinded by z. The additional computations to be performed are NTT(z) as well as "-â∘ẑ-ẑ" to remove the blinding. However, a pointwise multiplication and addition is rather cheap on most architectures and one additional NTT is quite favorable compared to other blinding or masking approaches.

An approach where (z,ẑ=NTT(Z)) are stored or refreshed is also possible. One approach is to store (z,ẑ) and to multiply each component of the pair by a random integer r←$^\$$Z$_q$. Thus (z$_{new}$=rz,ẑ$_{new}$=rẑ)). This can also be interpreted as the usage of a random multiple of z,ẑ for blinding. Moreover, the NTT is linear. Thus it is possible to compute zXx$^y$ where is the indeterminate and r is a random integer in the range a to n. Basically, this is a shift of z by r. The same shift can be applied to the value x$^r$ẑ rather efficiently. A refreshed pair (z$_{new}$,ẑ$_{new}$) can thus be generated by using this trick. z$_{new}$ is the sum of multiples shifted values of z. And the equivalent to these shifts is applied to ẑ$_{new}$.

Figure 3:
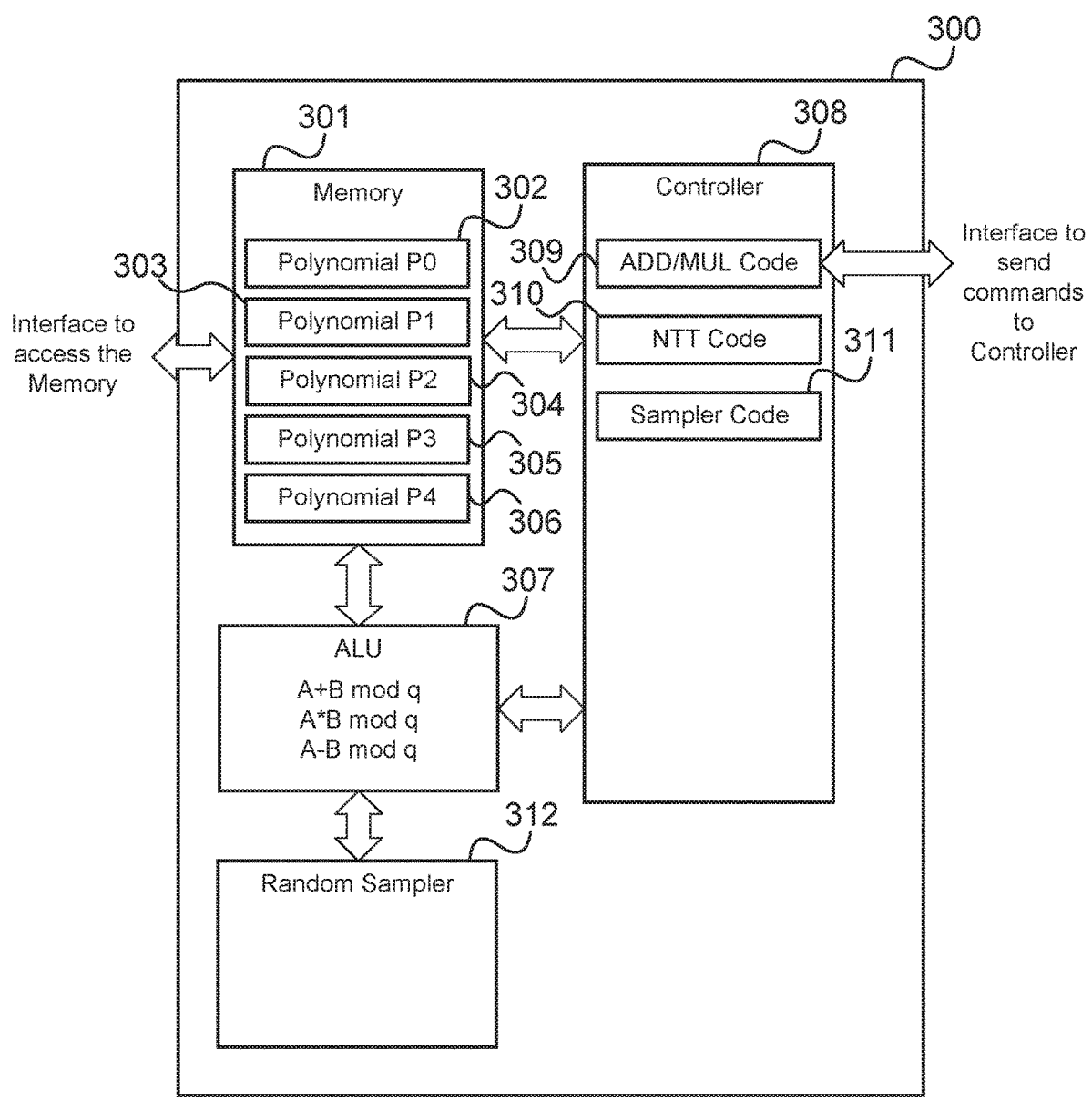
FIG. 3 shows a processing circuit illustrating an implementation of the above procedures.

FIG. 3 shows a processing circuit 300 illustrating an implementation of the above procedures.

The processing circuit 300 includes a memory 301 that can hold polynomials (P0 to P4) 302 to 306, an ALU (arithmetic logic unit) 307, a controller 308 with instructions for various operations 309 to 311 and a random sampler 312.

The processing circuit 300 may be part of a processing device and its memory 301 and its controller 307 may be accessed by other components of the processing device via a respective interface.

The processing can execute the various commands according to the procedures described herein and realize randomization of the internal state of the processing circuit 300.

In the following, an embodiment to protect the key generation of the GLP12 signature scheme against implementation attacks by using the aforementioned approach as detailed in ComputeBlindedInv is shown. The approach is to randomize the secret keys components $s_1,s_2$ with a random polynomial z before performing the polynomial multiplication.

GLP.GEN-PROTECTION1( )
1) a α←$^\$$R$_q$
2) Generate (z,z$^{-1}$)
3) â=NTT(a)
4) $s_1$←$^\$$R$_1$
5) Compute $s_1$'=z·$s_1$
6) $s_2$←$^\$$R$_1$
7) Compute $s_2$'=z·$s_2$
8) Compute t'=α·$s_1$'+$s_2$'
9) Compute t=z$^{-1}$·t'
10) Return pk=(t,α) and sk=($s_1$,$s_2$)

Alternatively, it is possible to return $s_1$',$s_2$',z instead of plain $s_1$,$s_2$ so that the secret key is stored in a randomized way.

The procedure can be combined with additive randomization. Assume a sampler MASKED-SAMPLER that samples a polynomial s∈R$_q$ from R$_1$ but hides internal values by randomizations and outputs the value s in a shared manner. This way the sampler outputs (s', s")=MASKED-SAMPLER(R$_1$) where s'=s+s" and where s" is from U(R$_q$). An example of the procedure is as follows.

GLP. GEN-PROTECTION2( )
1) α←$^\$$R$_q$
2) Generate (z,z$^{-1}$)
3) ($s_1$', $s_1$")=MASKED-SAMPLER(R$_1$)
4) ($s_2$',$s_2$")=MASKED-SAMPLE(R$_2$)
5) $d_1$'=z·$s_1$'
6) $d_1$"=z·$s_1$"
7) $d_2$'=z·$s_2$'
8) $d_2$"=z·$s_2$'
9) Compute t'=α·$d_1$'+a·$d_1$"+$d_2$'+$d_2$"
10) Compute t=z$^{-1}$·t'
11) Return pk=(t,α) and sk=($s_1$'+$s_1$",$s_2$'+$s_2$")

Another option is to not randomize the already randomized values of the secret key but to randomize the public value during the critical computation:

GLP. GEN-PROTECTION3( )
1) a←$^\$$R$_q$
2) Generate (z,z$^{-1}$)
3) ($s_1$',$s_1$")=MASKED-SAMPLER(R$_1$)
4) ($s_2$',$s_2$")=MASKED-SAMPLER(R$_2$)
5) α'=z·α
6) $d_2$'=z·$s_2$'
7) $d_2$"=z·$s_2$"
8) Compute t'=a'·$s_1$'+α'·$s_1$"+$d_2$'+$d_2$"
9) Compute t=z$^{-1}$·t'
10) Return pk=(t,a) and sk=($s_1$'+$s_1$",$s_2$'+$s_2$")

Similarly, the procedure can be integrated into the RLWE public key encryption scheme combining the ComputeBlindedInvNTT and ComputeBlindedAddNTT proposal. The RLWE.CPA.Dec($c=[c_1,c_2],r_2$) algorithm requires the computation of $c_1 \cdot r_2 + c_2$ and a final decoding where $r_2$ is a critical asset. Here the secrete key $r_2$ is protected ComputeBlindedAddNTT and the public value cis masked by the multiplicative ComputeBlindedInvNTT.

The decoding can be secured by a masked decoder as described in when the input to the decoder is additively shared. Thus, $(m'',m')=$MaskedDecoder($v',v''$) for $v=v'+v''$ and $v',v'',v \in R_q$ and message $m=m''$xor $m'$ for $m,m',m'' \in \{0,1\}^*$. It is assumed that $r_2$ is already stored in NTT format as $\hat{r}_2=$NTT($r_2$). An exemplary procedure is as follows.

RLWE.CPA.Dec-PROTECTION($c=[c_1,c_2],\hat{r}_2$):
1. Generation of ($\hat{z},\hat{z}^{-1}$)
2. $\hat{w} \leftarrow^\$ U(R_q)$
3. $\hat{r}_2'=\hat{r}_2+\hat{w}$
4. $\hat{c}_1=$NTT($c_1$)
5. $\hat{c}_1'=\hat{c}_1 \circ \hat{z}$
6. Compute $\hat{t}'=\hat{r}_2' \circ \hat{c}_1'$
7. Compute $\hat{t}''=\hat{z}^{-1} \circ \hat{t}'$
8. Compute $t=$NTT$^{-1}(\hat{t}'')$
9. Compute $y=$NTT$^{-1}(\hat{w} \circ \hat{c}_1)$
10. return $(m'',m')=$MaskedDecoder($t+c_2,-y$)

Figure 4:
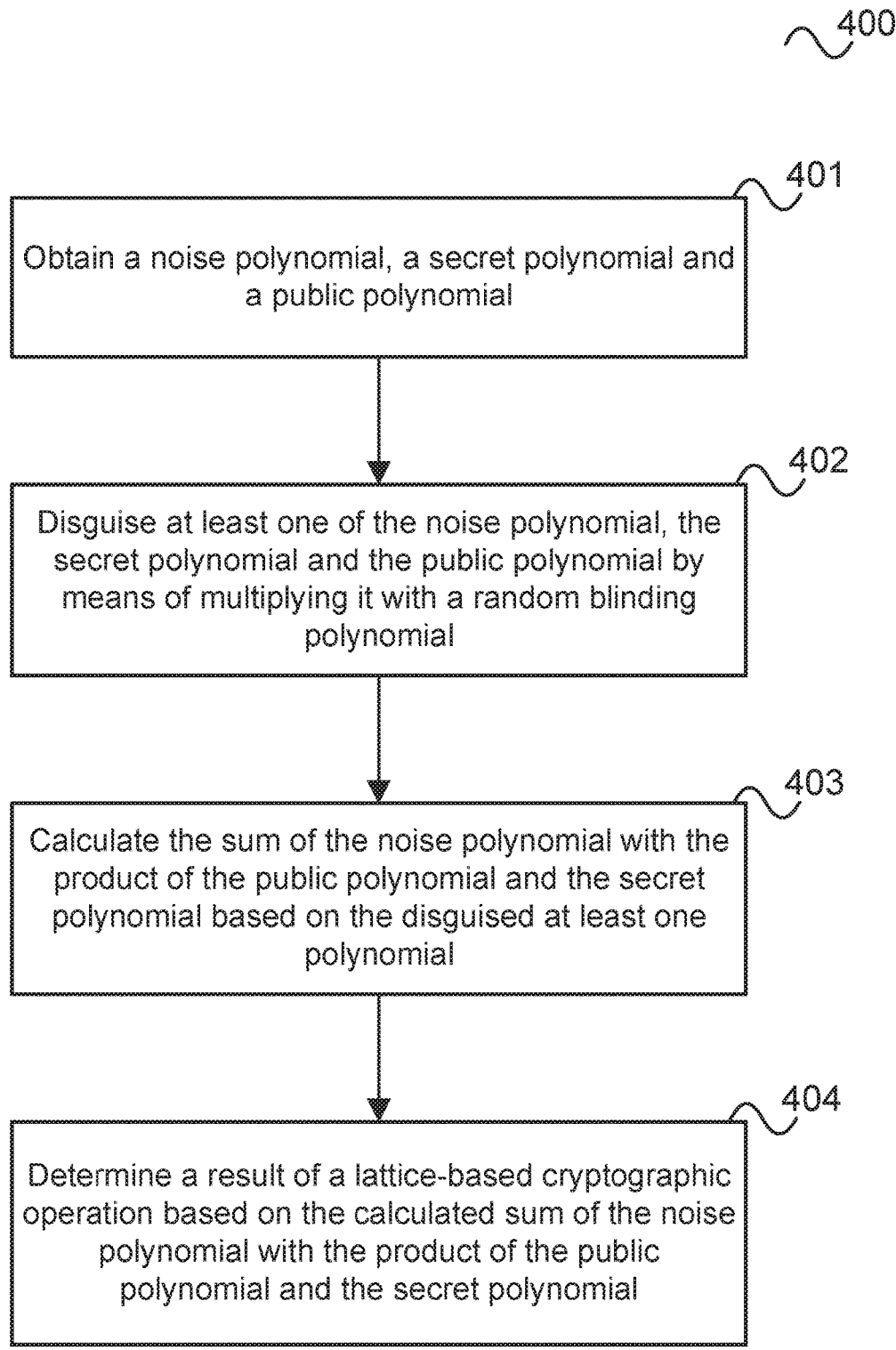
FIG. 4 shows a flow diagram illustrating a method for performing a lattice-based cryptographic operation.

The input to MaskedDecoder is $v'=t+c_2 \cdot c_1+w \cdot c_1+c_2$ and $v''=-w \cdot c_1$ and thus $v=v'+v''=r_2 \cdot c_1+w \cdot c_1+c_2-w \cdot c_1=r_2 \cdot c_1+c_2$ In summary, according to various embodiments, a method is provided as illustrated in FIG. 4.

FIG. 4 shows a flow diagram 400 illustrating a method for performing a lattice-based cryptographic operation.

In 401, a noise polynomial, a secret polynomial and a public polynomial are obtained (not necessarily in that order).

In 402, at least one of the noise polynomial, the secret polynomial and the public polynomial are disguised by means of multiplying it with a random blinding polynomial.

In 403, the sum of the noise polynomial with the product of the public polynomial and the secret polynomial is calculated based on the disguised at least one polynomial.

In 404, a result of the lattice-based cryptographic operation is determined based on the calculated sum of the noise polynomial with the product of the public polynomial and the secret polynomial.

According to various embodiments, in other words, at least one of the polynomials a (public polynomial), s (secret polynomial) and e (noise polynomial) for the calculation of $t=a \cdot s+e$ is disguised (i.e. blinded or masked) by multiplying it with a random (blinding or masking) polynomial.

The method may include determining one or more of the noise polynomial, the secret polynomial and the public polynomial. The noise polynomial, the secret polynomial and the public polynomial may also be predetermined by a crypto system. The noise polynomial and the secret polynomial may for example be a secret key and the public polynomial can be a system constant.

The secret polynomial may for example be determined by random sampling from a set (which does not correspond to a uniform distribution) or a distribution such as a uniform distribution, a discrete Gaussian distribution, a small uniform distribution or a sparse distribution (i.e. a polynomial with many coefficients equal to zero and few non-zero coefficients).

The cryptographic operation may operate on data received by a communication device (e.g. a processing device as described herein) from another communication device. For example, the cryptographic operation may extract useful data from data received by the communication device via a communication channel. The useful data may for example include control data and the communication device may perform a control action based on the extracted control data. For example, a microcontroller in a car may receive control data in this fashion and may perform a control action based on the control data. The communication device may also store or forward the data processed by means of the cryptographic operation. The cryptographic operation may thus serve to secure a communication channel between two communication devices wherein the secret data (noise polynomial and secret polynomial) in the communication endpoints (i.e. the communication devices) based on which the communication channel is secured, is protected in the communication devices by blinding them when they are used for calculations. The security of the communication channel and of the transmitted data can thus be ensured.

The method may be performed by means of a processing device as for example described with reference to FIG. 1 (not necessarily with all the components shown in FIG. 1). The calculation oft may be performed by a hardware accelerator. For example, the multiplication of a and s may be performed by a polynomial multiplication processor, i.e. a processor optimized for polynomial multiplication. The method may be at least partially be performed by means of a secure processor, i.e. a "hardened" device.

Figure 5:
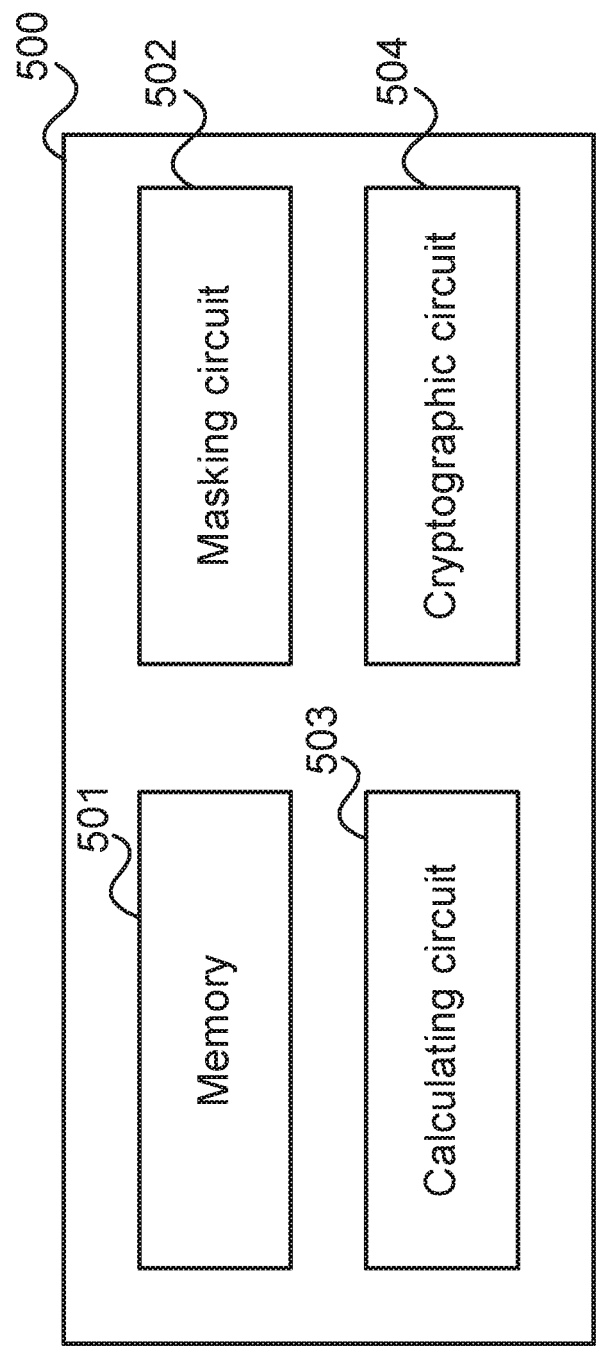
FIG. 5 shows a processing device for performing a lattice-based cryptographic operation.

FIG. 5 shows a processing device 500 for performing a lattice-based cryptographic operation.

The processing device 500 includes a memory 501 configured to store a noise polynomial, a secret polynomial and a public polynomial.

The processing device 500 further includes a masking circuit 502 configured to disguise at least one of the noise polynomial, the secret polynomial and the public polynomial by multiplying it with a random blinding polynomial.

Additionally, the processing device 500 includes a calculating circuit 503 configured to calculate the sum of the noise polynomial with the product of the public polynomial and the secret polynomial based on the disguised at least one polynomial.

The processing device 500 further includes a cryptographic circuit 504 configured to determine a result of the lattice-based cryptographic operation based on the calculated sum of the noise polynomial with the product of the public polynomial and the secret polynomial.

The processing device 500 may include a generating circuit configured to generate one or more of the noise polynomial, secret polynomial and public polynomial before storing them. It may also includes a receiver configured to receive a representation of one or more of the noise polynomial, secret polynomial and public polynomial. It should be noted that any features and embodiments described in context of the method of FIG. 4 are analogously valid for the processing device of FIG. 5 and vice versa.

The communication device (e.g. the communication subsystem, the application processor and the cryptographic circuit) may for example be implemented by one or more processors. A "processor" may be understood as any kind of a logic implementing entity, which may be special purpose circuitry or a processor executing software stored in a memory, firmware, or any combination thereof. Thus, a "processor" may be a hard-wired logic processor or a programmable logic processor such as a programmable processor, e.g. a microprocessor. A "processor" may also be a processor executing software, e.g. any kind of computer program. Any other kind of implementation of the respective functions which will be described in more detail below may also be understood as a "processor".

Various Examples are described in the following:

Example 1 is a method for performing a lattice-based cryptographic operation as illustrated in FIG. 4.

Example 2 is the method of Example 1, wherein one or more of the secret polynomial, the noise polynomial and the public polynomial represent one or more secret cryptographic keys.

Example 3 is the method of Example 1 or 2, wherein the sum of the noise polynomial with the product of the public polynomial and the secret polynomial represents a public key or a cipher text.

Example 4 is the method of any one of Examples 1 to 3, including disguising the noise polynomial and the secret polynomial by multiplying them with the same random blinding polynomial or different blinding polynomials.

Example 5 is the method of any one of Examples 1 to 4, including disguising at least one of the noise polynomial, the secret polynomial and the public polynomial to prevent leakage of information about the secret polynomial or the noise polynomial.

Example 6 is the method of any one of Examples 1 to 5, including disguising at least one of the noise polynomial, the secret polynomial and the public polynomial to prevent physical attacks on the secret polynomial, the noise polynomial or both.

Example 7 is the method of any one of Examples 1 to 6, including generating the random blinding polynomial based on an output of a random number generator.

Example 8 is the method of any one of Examples 1 to 7, including generating the random blinding polynomial by sampling it from a uniform distribution.

Example 9 is the method of any one of Examples 1 to 8, including determining the noise polynomial by random sampling from an error distribution.

Example 10 is the method of Example 9, wherein the error distribution is a uniform distribution, a discrete Gaussian distribution or a small uniform distribution.

Example 11 is the method of any one of Examples 1 to 10, including determining the secret polynomial by random sampling from a set or uniform distribution, discrete Gaussian distribution, small uniform distribution or sparse distribution.

Example 12 is the method of any one of Examples 1 to 11, wherein the noise polynomial, the secret polynomial, the public polynomial and the blinding polynomial are polynomials modulo a predetermined polynomial with coefficients modulo a predetermined integer.

Example 13 is the method of any one of Examples 1 to 12, including calculating the sum of the noise polynomial with the product of the public polynomial and the secret polynomial for the same secret polynomial for a multiplicity of different public polynomials.

Example 14 is the method of Example 13, including blinding at least one of the secret polynomial and the noise polynomial to prevent the extraction of information of the secret polynomial from the calculations for the multiplicity of different public polynomials by an attacker.

Example 15 is the method of Example 13 or 14, including refreshing the random blinding operations between calculations of the sum of the noise polynomial with the product of the public polynomial and the secret polynomial for different public polynomials.

Example 16 is the method of any one of Examples 1 to 15, including disguising at least one of the noise polynomial and the secret polynomial by multiplying it with a random blinding polynomial and adding the same or a different random blinding polynomial to the result of the multiplication or adding a random blinding polynomial to it and multiplying the result of the sum with the same or a different random blinding polynomial.

Example 17 is the method of any one of Examples 1 to 16, including performing the disguising of at least one of the noise polynomial, the secret polynomial and the public polynomial and calculating the sum of the noise polynomial with the product of the public polynomial and the secret polynomial based on the disguised at least one polynomial in Number Theoretic Transform domain.

Example 18 is the method of Example 17, including transforming the noise polynomial, the secret polynomial and the public polynomial into Number Theoretic Transform domain and transforming the result of the sum of the noise polynomial with the product of the public polynomial and the secret polynomial back from Number Theoretic Transform domain.

Example 19 is the method of any one of Examples 1 to 18, including performing the lattice-based cryptographic operation in a signature or public key crypto processing.

Example 20 is a processing device for performing a lattice-based cryptographic operation as illustrated in FIG. 5.

Example 21 is the processing device of Example 20, wherein one or more of the secret polynomial, the noise polynomial and the public polynomial represent one or more secret cryptographic keys.

Example 22 is the processing device of Example 20 or 21, wherein the sum of the noise polynomial with the product of the public polynomial and the secret polynomial represents a public key or a cipher text.

Example 23 is the processing device of any one of Examples 20 to 22, including disguising the noise polynomial and the secret polynomial by multiplying them with the same random blinding polynomial or different blinding polynomials.

Example 24 is the processing device of any one of Examples 20 to 23, wherein the masking circuit is configured to disguise at least one of the noise polynomial, the secret polynomial and the public polynomial to prevent leakage of information about the secret polynomial or the noise polynomial.

Example 25 is the processing device of any one of Examples 20 to 24, wherein the masking circuit is configured to disguise at least one of the noise polynomial, the secret polynomial and the public polynomial to prevent physical attacks on the secret polynomial, the noise polynomial or both.

Example 26 is the processing device of any one of Examples 20 to 25, including a generating circuit configured to generate the random blinding polynomial based on an output of a random number generator.

Example 27 is the processing device of any one of Examples 20 to 26, including a generating circuit configured to generate the random blinding polynomial by sampling it from a uniform distribution.

Example 28 is the processing device of any one of Examples 20 to 27, including a generating circuit configured to determine the noise polynomial by random sampling from an error distribution.

Example 29 is the processing device of Example 28, wherein the error distribution is a uniform distribution, a discrete Gaussian distribution or a small uniform distribution.

Example 30 is the processing device of any one of Examples 20 to 29, including a generating circuit configured to determine the secret polynomial by random sampling from a set or uniform distribution, discrete Gaussian distribution, small uniform distribution or sparse distribution.

Example 31 is the processing device of any one of Examples 20 to 30, wherein the noise polynomial, the secret polynomial, the public polynomial and the blinding polynomial are polynomials modulo a predetermined polynomial with coefficients modulo a predetermined integer.

Example 32 is the processing device of any one of Examples 20 to 31, wherein the calculating circuit is configured to calculate the sum of the noise polynomial with the product of the public polynomial and the secret polynomial for the same secret polynomial for a multiplicity of different public polynomials.

Example 33 is the processing device of Example 32, wherein the masking circuit is configured to blind at least one of the secret polynomial and the noise polynomial to prevent the extraction of information of the secret polynomial from the calculations for the multiplicity of different public polynomials by an attacker.

Example 34 is the processing device of Example 32 or 33, wherein the masking circuit is configured to refresh the random blinding operations between calculations of the sum of the noise polynomial with the product of the public polynomial and the secret polynomial for different public polynomials.

Example 35 is the processing device of any one of Examples 20 to 34, wherein the masking circuit is configured to disguise at least one of the noise polynomial and the secret polynomial by multiplying it with a random blinding polynomial and adding the same or a different random blinding polynomial to the result of the multiplication or adding a random blinding polynomial to it and multiplying the result of the sum with the same or a different random blinding polynomial.

Example 36 is the processing device of any one of Examples 20 to 35, wherein the masking circuit and the calculating circuit are configured to perform the disguising of at least one of the noise polynomial, the secret polynomial and the public polynomial and calculating the sum of the noise polynomial with the product of the public polynomial and the secret polynomial based on the disguised at least one polynomial in Number Theoretic Transform domain.

Example 37 is the processing device of Example 36, wherein the masking circuit and the calculating circuit are configured to transform the noise polynomial, the secret polynomial and the public polynomial into Number Theoretic Transform domain and to transform the result of the sum of the noise polynomial with the product of the public polynomial and the secret polynomial back from Number Theoretic Transform domain.

Example 38 is the processing device of any one of Examples 20 to 37, configured to perform the lattice-based cryptographic operation in a signature or public key crypto processing.

According to a further Example a processing device for performing a lattice-based cryptographic operation is provided including an obtaining means configured to obtain a noise polynomial, a secret polynomial and a public polynomial; a disguising means configured to disguise at least one of the noise polynomial, the secret polynomial and the public polynomial by means of multiplying it with a random blinding polynomial; a calculating means configured to calculate the sum of the noise polynomial with the product of the public polynomial and the secret polynomial based on the disguised at least one polynomial; and a determining means configured to determine a result of the lattice-based cryptographic operation based on the calculated sum of the noise polynomial with the product of the public polynomial and the secret polynomial.

It should be noted that features and examples described in context of one of the processing devices are also valid for the other processing device and the method and vice versa.

LIST OF REFERENCE SIGNS 100 processing device
101 CPU
102 RANI
103 NVM
104 crypto module
105 bus
106 analog module
107 I/O interface
108 LBC core
109 AES core
110 SHA core
111 ECC core
112 HRNG
200 processing device
201 hardware security module
202 controller
203 crypto modules
204 AES core
205 LBC core
206 HRNG
207 application processor
208 NVM
209 RANI
210 interface
300 processing circuit
301 memory
302-306 polynomials
307 ALU
308 controller
309-311 operations
312 random sampler
400 flow diagram
401-404 method steps
500 processing device
501 memory
502 masking circuit
503 calculating circuit
504 cryptographic circuit While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A computer implemented method for performing a lattice-based cryptographic operation using a processing device and/or a hardware security module, the method comprising:

obtaining from a memory a noise polynomial, a secret polynomial and a public polynomial;

reducing leakage of information about the secret polynomial or the noise polynomial by disguising, using a masking circuit, at least one of the noise polynomial, the secret polynomial and the public polynomial, wherein disguising the at least one of the noise polynomial, the secret polynomial and the public polynomial comprises a security controller circuit multiplying the at least one of the noise polynomial, the secret polynomial and the public polynomial with a random blinding polynomial;

the security controller circuit calculating the sum of the noise polynomial with the product of the public polynomial and the secret polynomial based on the disguised at least one of the noise polynomial, the secret polynomial and the public polynomial;

the security controller circuit determining a result of the lattice-based cryptographic operation based on the calculated sum of the noise polynomial with the product of the public polynomial and the secret polynomial;

wherein multiplying the at least one of the noise polynomial, the secret polynomial and the public polynomial with the random blinding polynomial transforms the at least one of the noise polynomial, the secret polynomial and the public polynomial into a disguised polynomial to prevent implementation attacks comprising at least one of physical attacks, observatory attacks, invasive attacks, or semi-invasive attacks.

2. The method of claim 1,
wherein one or more of the secret polynomial, the noise polynomial and the public polynomial represent one or more secret cryptographic keys.

3. The method of claim 1,
wherein the sum of the noise polynomial with the product of the public polynomial and the secret polynomial represents a public key or a cipher text.

4. The method of claim 1, further comprising:
disguising the noise polynomial and the secret polynomial by multiplying them with the same random blinding polynomial or different blinding polynomials.

5. The method of claim 1, further comprising:
disguising at least one of the noise polynomial, the secret polynomial and the public polynomial to prevent physical attacks on the secret polynomial, the noise polynomial or both.

6. The method of claim 1, further comprising:
generating the random blinding polynomial based on an output of a random number generator.

7. The method of claim 1, further comprising:
generating the random blinding polynomial by sampling it from a uniform distribution.

8. The method of claim 1, further comprising:
determining the noise polynomial by random sampling from an error distribution.

9. The method of claim 8,
wherein the error distribution is a uniform distribution, a discrete Gaussian distribution or a small uniform distribution.

10. The method of claim 1, further comprising:
determining the secret polynomial by random sampling from a set or uniform distribution, discrete Gaussian distribution, small uniform distribution or sparse distribution.

11. The method of claim 1,
wherein the noise polynomial, the secret polynomial, the public polynomial and the blinding polynomial are polynomials modulo a predetermined polynomial with coefficients modulo a predetermined integer.

12. The method of claim 1, further comprising:
calculating the sum of the noise polynomial with the product of the public polynomial and the secret polynomial for the same secret polynomial for a multiplicity of different public polynomials.

13. The method of claim 12, further comprising:
blinding at least one of the secret polynomial and the noise polynomial to prevent the extraction of information of the secret polynomial from the calculations for the multiplicity of different public polynomials by an attacker.

14. The method of claim 12, further comprising:
refreshing the random blinding operations between calculations of the sum of the noise polynomial with the product of the public polynomial and the secret polynomial for different public polynomials.

15. The method of claim 1, further comprising:
disguising at least one of the noise polynomial and the secret polynomial by multiplying it with a random blinding polynomial and adding the same or a different random blinding polynomial to the result of the multiplication or adding a random blinding polynomial to it and multiplying the result of the sum with the same or a different random blinding polynomial.

16. The method of claim 1, further comprising:
performing the disguising of at least one of the noise polynomial, the secret polynomial and the public polynomial and calculating the sum of the noise polynomial with the product of the public polynomial and the secret polynomial based on the disguised at least one polynomial in Number Theoretic Transform domain.

17. The method of claim 16, further comprising:
transforming the noise polynomial, the secret polynomial and the public polynomial into Number Theoretic Transform domain and transforming the result of the sum of the noise polynomial with the product of the public polynomial and the secret polynomial back from Number Theoretic Transform domain.

18. The method of claim 1, further comprising:
performing the lattice-based cryptographic operation in a signature or public key crypto processing.

19. The method of claim 1, wherein obtaining a noise polynomial comprises random sampling from an error distribution.

20. A processing device for performing a lattice-based cryptographic operation, the processing device comprising:
a memory configured to store a noise polynomial, a secret polynomial and a public polynomial;
a masking circuit configured to reduce leakage of information about the secret polynomial or the noise polynomial by disguising at least one of the noise polynomial, the secret polynomial and the public polynomial, wherein disguising the at least one of the noise polynomial, the secret polynomial and the public polynomial comprises multiplying the at least one of the noise polynomial, the secret polynomial and the public polynomial with a random blinding polynomial;
a calculating circuit configured to calculate the sum of the noise polynomial with the product of the public polynomial and the secret polynomial based on the disguised at least one of the noise polynomial, the secret polynomial and the public polynomial;
a cryptographic circuit configured to determine a result of the lattice-based cryptographic operation based on the calculated sum of the noise polynomial with the product of the public polynomial and the secret polynomial;
wherein multiplying the at least one of the noise polynomial, the secret polynomial and the public polynomial with the random blinding polynomial transforms the at least one of the noise polynomial, the secret polynomial and the public polynomial into a disguised polynomial to prevent implementation attacks comprising at least one of physical attacks, observatory attacks, invasive attacks, or semi-invasive attacks.

* * * * *